(No Model.)
J. F. PLACE.
BICYCLE OR VEHICLE LAMP BRACKET.
No. 574,568. Patented Jan. 5, 1897.
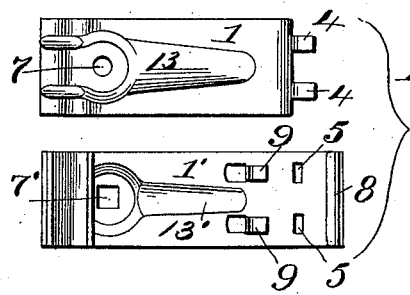
Fig. 1
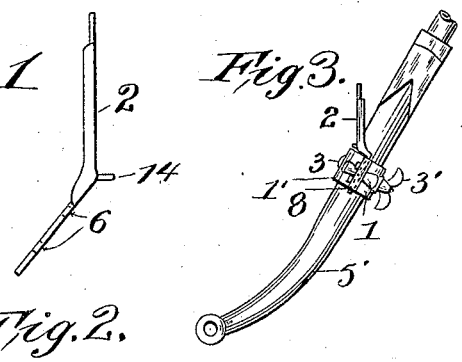
Fig. 3
Fig. 2
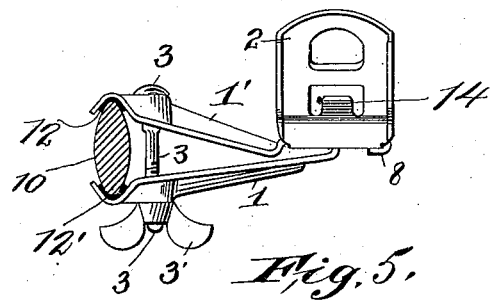
Fig. 5
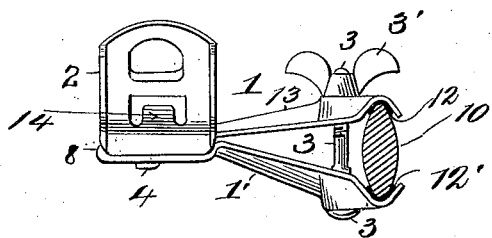
Fig. 4
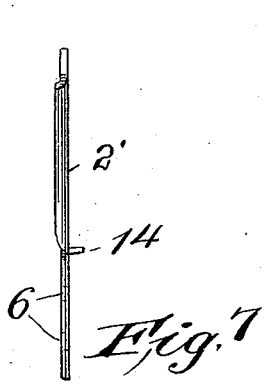
Fig. 7
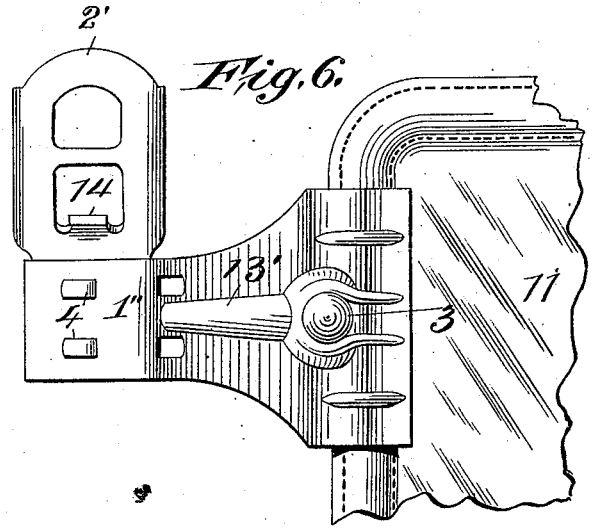
Fig. 6
WITNESSES
C. W. Benjamin
J. G. Gadsden
INVENTOR
Jas. F. Place

UNITED STATES PATENT OFFICE.

JAMES F. PLACE, OF GLEN RIDGE, NEW JERSEY.

BICYCLE OR VEHICLE LAMP BRACKET.

SPECIFICATION forming part of Letters Patent No. 574,568, dated January 5, 1897.

Application filed July 27, 1896. Serial No. 600,611. (No model.)

*To all whom it may concern:*

Be it known that I, JAMES F. PLACE, a citizen of the United States, and a resident of Glen Ridge, Essex county, and State of New Jersey, have invented a new and useful Improvement in Bicycle or Vehicle Lamp Brackets, of which the following is a specification.

My invention relates to improvements in lamp or lantern brackets for vehicles, and especially for use on the "fork," so called, of bicycles and on the dashboard of carriages.

The objects of my improvements are, first, to provide a strong and handy bracket which can readily be put on or taken off without the use of any wrench or screw-driver, and, second, to make the bracket reversible, so that it can be used on either side of the fork of the bicycle or on either side of the dashboard of a carriage and at the same time carry the lamp erect, and, third, to secure the maximum of strength and minimum of weight with least number of parts, and, fourth, to reduce the cost of manufacture. I attain these objects by the mechanism illustrated in the accompanying drawings, in which—

Figure 1 is a view of the two principal pieces of my improved lamp-bracket. Fig. 2 is a view of the third or upright piece used when the bracket is in use as a bicycle-lamp bracket. Fig. 3 is a view of complete lamp-bracket fixed to the fork of a bicycle ready for use. Figs. 4 and 5 are plan views of bracket in line with fork of bicycle when used on left and right hand side, respectively, of the fork. Fig. 6 is a view of the bracket when used on the dashboard of a carriage, looking toward front of dashboard. Fig. 7 is a side view of the upright piece, Fig. 2, when used on the dashboard of a carriage, being shown as straight the full length, whereas when used on the fork of a bicycle this piece has the lower end or shank bent as shown in Fig. 2 to take up for the slant of the fork, so that the upper end of this piece which engages the clamp of a lamp will at all times be erect.

Similar reference-marks refer to similar parts throughout the several views.

In a detail description, 1 is the back side piece, and 1' is the forward side piece of the bracket. Both of these pieces have one end bent, as shown, so as to clamp or grip either arm of a bicycle-fork or the edge of the dashboard of a carriage.

2 is the upright piece when in use on a bicycle, and 2' is the same piece when used on the dashboard of a carriage. This upright piece is made removable and reversible, so it can be fixed to the side pieces in an upright position when the bracket is gripped to either arm of a bicycle-fork.

1" is the side piece 1' when used on a carriage, this view being the other side of piece from side shown in Fig. 1, the clamping end being made somewhat wider, as shown, so as to grip the edge of the dashboard the better.

3 is a bolt near the clamping ends of the side pieces which goes through the same and clamps or forces the two side pieces together, and 3' is the nut on same.

Any form of bolt or nut may be used, but I prefer the wing or thumb nut for easy operation by the hand.

The shape of the side piece or pieces or the manner of gripping the bicycle-fork by the bracket is not essential so long as means for effectually gripping or clamping either arm of the same are had, and the bracket is firmly fixed to the fork when in use.

4 4 are two prongs on the end of the back side piece 1, which pass through the slots 5 5 on the forward side piece 1', and also through the two similar slots 6 6, which engage the two prongs in the lower part or shank of the upright piece 2 (or 2') and hold the same firmly in place between the two outward ends of the side pieces 1 and 1'. One prong is sufficient, but I prefer two, as shown.

10 and 10' are cross-sections of the right and left sides, respectively, of the fork of a bicycle, and 11 is a part of the front of the dashboard of a carriage.

The holes 7 and 7' in the side pieces 1 and 1' for the clamping-bolt 3 to pass through are made as close as possible to the clamping ends which go onto the fork or dashboard. One, 7', is made square, so that the bolt, which has a square part near the head like an ordinary carriage-bolt, cannot turn around.

The outside end of the forward side piece 1' has the edge turned over, as shown at 8, and two lugs 9 9 are also punched out and turned toward the end. These are for holding the upright piece 2 or 2' in place, as it (the upright piece) slides between the turned end 8 and the lugs 9 9. This turned end 8 can be dispensed with in case the upright piece 2 is fixed to one of the side pieces by a swivel-joint.

12 and 12' are pieces of felt or rubber cemented to the inside face of the clamping ends of the side pieces 1 and 1', so that when the bracket is tightly screwed up onto the bicycle-fork or dashboard it will not mar the same and will grip either one more securely.

13 and 13' are strengthening-ribs thrown up on the metal to give great strength to the side pieces.

14 is a tongue-piece in the upright 2 and 2', which is thrown out for the lamp to rest on. This I call a "projecting" lamp-rest.

It will be noticed that my improved lamp-bracket is reversible; that is, it can be used on either side of the fork of a bicycle, which is entirely a novel feature not possessed by any other bicycle-lamp bracket. This is a great convenience and a most valuable feature. By its peculiar shape and by reason of the ribs 13 and 13' it is given great strength and can be made sufficiently strong without exceeding four or five ounces in weight, and by simply operating the wing-nut 3' it can be fixed to or taken from the bicycle-fork or carriage-dashboard in one minute's time. It can also be changed from one side to the other of bicycle or carriage with the greatest ease and rapidity without use of wrench, screwdriver, or any other tool. Being made in but three or four pieces, all of which come apart by loosening the wing-nut, it can be packed away in tool-bag or pocket with the least possible room. Being stamped from sheet metal and finished in the dies as the three pieces come from the press, the cost of manufacture is reduced to the minimum.

By arranging the gripping side pieces as I do, having a clamping-bend to grip the bicycle-fork or carriage-dash board at one end and prongs and corresponding holes to hold the upright piece for holding the lamp at the opposite ends, one bolt only and one operation grips all the parts tightly together and firmly clamps the bicycle-fork at same time. This is a valuable feature of my invention. A necessity to this end, it will be noticed, is the making of one of the gripping side pieces longer than the other, and the placing the bolt between the clamping ends of the side pieces and the ends having one or more prongs or corresponding holes.

Having thus described my invention, what I claim as new and original, and desire to secure by Letters Patent, is—

1. In a bicycle or carriage lamp bracket the combination of a short gripping side piece having one or more prongs on one end, and a clamping-bend on the opposite end; a long gripping side piece having one or more holes near one end (corresponding to and adapted to engage the said one or more prongs) and a clamping-bend on the opposite end; a reversible upright piece for holding the lamp, having also one or more holes corresponding to the said one or more prongs and means between the ends of the gripping side pieces for gripping the said upright piece at one end and the bicycle-fork or carriage-dash board between the clamping-bends at the opposite end of said side pieces, both at one operation, and substantially as herein shown and described.

2. The combination in a bicycle or carriage lamp bracket of a short and a long gripping side piece, each having a bent or clamping end and a raised strengthening-rib; a reversible upright piece for holding the lamp; one or more prongs on the end of the short side piece opposite to the clamping-end; one or more holes in the long side piece near the end opposite to the clamping end, and also in the shank of said upright piece; all of said holes corresponding to and adapted to engage said one or more prongs; and a bolt passing through a square hole in one side piece and a round hole in the other between the clamping ends and the one or more prongs and corresponding holes—whereby with a nut, and by one operation, the upright piece is tightly gripped between the ends of the side pieces, and the bicycle-fork or carriage-dash board is clamped by the opposite ends of said side pieces, within the clamping-bends thereof, substantially as shown and described.

In testimony that I claim the foregoing as my invention I have signed my name, in presence of two witnesses, this 24th day of July, 1896.

JAS. F. PLACE.

Witnesses:
E. D. TERRY,
J. G. GADSDEN.